(12) United States Patent
Bertin (10) Patent No.: US 9,224,057 B2
(45) Date of Patent: Dec. 29, 2015

(54) BIOMETRIC IDENTIFICATION

(71) Applicant: OBERTHUR TECHNOLOGIES, Colombes (FR)

(72) Inventor: Marc Bertin, La Celle les Bordes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/064,352

(22) Filed: Oct. 28, 2013

(65) Prior Publication Data

US 2014/0119617 A1    May 1, 2014

(30) Foreign Application Priority Data

Oct. 26, 2012   (FR) ...................................... 12 60231

(51) Int. Cl.
```
G06K 9/00      (2006.01)
G05B 19/00     (2006.01)
G05B 23/00     (2006.01)
G06F 7/00      (2006.01)
G06F 7/04      (2006.01)
G06K 19/00     (2006.01)
G08B 29/00     (2006.01)
G08C 19/00     (2006.01)
H04B 1/00      (2006.01)
H04B 3/00      (2006.01)
H04Q 1/00      (2006.01)
H04Q 3/00      (2006.01)
G06F 21/32     (2013.01)
```

(52) U.S. Cl.
CPC ............ *G06K 9/00892* (2013.01); *G06F 21/32* (2013.01)

(58) Field of Classification Search
None
See application file for complete search history.

(56) References Cited

U.S. PATENT DOCUMENTS

| 5,634,667  | A  | * | 6/1997  | Jordan ............................ 281/29 |
| 5,638,832  | A  | * | 6/1997  | Singer .................. A01K 11/006 128/899 |
| RE37,071   | E  | * | 2/2001  | Gabrielian et al. ...... 351/159.69 |
| 6,275,726  | B1 | * | 8/2001  | Chan .................... A61B 5/1455 356/432 |
| 6,684,810  | B2 | * | 2/2004  | Martin ................. A01K 11/008 119/51.02 |
| 6,828,908  | B2 | * | 12/2004 | Clark ................... A61B 5/0031 340/10.1 |
| 6,853,854  | B1 | * | 2/2005  | Proniewicz .......... A61B 5/1455 382/128 |

(Continued)

OTHER PUBLICATIONS

QR code tattoos—QR Code Stickers , www.qrcodestickers.org/qr-code-articles/qr-code-tattoos.html, Jan. 7, 2012.*

(Continued)

*Primary Examiner* — Randolph I Chu
(74) *Attorney, Agent, or Firm* — Young & Thompson (57) ABSTRACT

A system for biometrically authenticating a user includes:
  elements for obtaining image data that are representative of at least one user-associated biometric feature and at least one user-associated identifier,
  elements for extracting the at least one biometric feature in the image data,
  elements for extracting the at least one identifier in the image data,
  elements for performing a search for a reference biometric feature associated with the at least one identifier,
  elements for comparing the extracted biometric feature with the reference biometric feature, and
  elements for authenticating the user in accordance with a result of the comparison.

20 Claims, 6 Drawing Sheets

(56) References Cited

U.S. PATENT DOCUMENTS

| | | | | |
|---|---|---|---|---|
| 7,180,304 B2* | 2/2007 | Grishin | G06K 19/067 | 324/637 |
| 7,263,213 B2* | 8/2007 | Rowe | G06K 9/0004 | 340/5.53 |
| 7,280,676 B2* | 10/2007 | Miura | G06K 9/00006 | 340/5.53 |
| 7,347,365 B2* | 3/2008 | Rowe | A61B 5/0059 | 235/382 |
| 7,394,919 B2* | 7/2008 | Rowe | G06K 9/0012 | 340/5.53 |
| 7,460,696 B2* | 12/2008 | Rowe | G06K 9/00046 | 382/115 |
| 7,508,965 B2* | 3/2009 | Rowe | G06K 9/00046 | 382/124 |
| 7,512,254 B2* | 3/2009 | Vollkommer | G06K 9/00 | 340/5.83 |
| 7,536,037 B2* | 5/2009 | Sung | G06K 9/00255 | 250/339.11 |
| 7,539,330 B2* | 5/2009 | Rowe | G06K 9/00046 | 340/5.53 |
| 7,545,963 B2* | 6/2009 | Rowe | G06K 9/00033 | 340/5.53 |
| 7,574,021 B2* | 8/2009 | Matey | G06K 9/00604 | 382/115 |
| 7,589,638 B2* | 9/2009 | Jackson | A01K 11/008 | 340/573.3 |
| 7,593,573 B2* | 9/2009 | Hahn | G06K 9/00791 | 250/332 |
| 7,602,942 B2* | 10/2009 | Bazakos | G06K 9/00255 | 209/577 |
| 7,616,964 B2* | 11/2009 | Riise | G06F 17/30241 | 455/432.3 |
| 7,668,350 B2* | 2/2010 | Rowe | G06K 9/00046 | 340/5.53 |
| 7,680,305 B2* | 3/2010 | Miura | A61B 5/02007 | 340/5.52 |
| 7,750,810 B2* | 7/2010 | Ritter | G07C 9/00087 | 340/330 |
| 7,801,339 B2* | 9/2010 | Sidlauskas | G06K 9/0012 | 340/5.53 |
| 7,804,984 B2* | 9/2010 | Sidlauskas | G06K 9/0004 | 340/5.53 |
| 7,869,043 B2* | 1/2011 | Campbell | G01J 3/021 | 356/4.01 |
| 7,899,218 B2* | 3/2011 | Satoshi | A61B 5/015 | 382/100 |
| 7,995,808 B2* | 8/2011 | Rowe | G06K 9/2018 | 382/124 |
| 8,111,879 B2* | 2/2012 | Phinney | G06K 9/00255 | 382/117 |
| 8,175,346 B2* | 5/2012 | Rowe | G06K 9/00013 | 340/5.53 |
| 8,229,185 B2* | 7/2012 | Ennis | G06K 9/00046 | 340/5.53 |
| 8,233,149 B2* | 7/2012 | Kishima | G06K 9/00013 | 356/432 |
| 8,339,486 B2* | 12/2012 | Nakashiba | G06K 9/0004 | 348/272 |
| 8,433,103 B2* | 4/2013 | Friedman | G06K 9/00255 | 382/116 |
| 8,477,235 B2* | 7/2013 | Mitani | H04N 5/228 | 250/339.01 |
| 8,494,227 B2* | 7/2013 | Prokoski | A61B 5/0064 | 250/208.1 |
| 8,570,149 B2* | 10/2013 | Rowe | A61B 5/0075 | 340/5.82 |
| 8,656,865 B1* | 2/2014 | Foote | A61D 7/00 | 119/712 |
| 8,721,344 B2* | 5/2014 | Marmaropoulos | G09B 23/286 | 434/262 |
| 8,768,014 B2* | 7/2014 | Du | G06K 9/0061 | 382/117 |
| 8,768,015 B2* | 7/2014 | Higuchi | A61B 5/1172 | 382/125 |
| 8,811,682 B2* | 8/2014 | Kanda | G06K 9/00046 | 340/5.83 |
| 8,811,690 B2* | 8/2014 | Dumont | G06K 9/00046 | 356/71 |
| 8,872,909 B2* | 10/2014 | Kumar | G06K 9/0008 | 348/77 |
| 8,977,648 B2* | 3/2015 | Shiell | G06F 17/30 | 707/736 |
| 2007/0086626 A1* | 4/2007 | Mariani et al. | | 382/115 |
| 2009/0036783 A1* | 2/2009 | Kishima | G06K 9/00013 | 600/476 |

OTHER PUBLICATIONS

French Search Report dated Aug. 26, 2013, corresponding to the Foreign Priority Application No. 12 60231.

* cited by examiner

BIOMETRIC IDENTIFICATION

FIELD OF THE INVENTION

The present invention relates to the field of security based on biometric identification (or authentication).

BACKGROUND OF THE INVENTION

Biometric authentication is used to provide access to places, goods or services in a secure manner.

Typically, the user to be authenticated presents: a fingerprint, an iris or the like, to a biometric authentication system. An image of this feature is then obtained and analyzed so that it can be compared with a bank of pre-recorded user-associated images. When the resulting image is a pre-recorded image, it is checked whether the user to whom the pre-recorded image corresponds is allowed or denied access to the secure site, good or service.

To facilitate the search for the pre-recorded image, the user may be asked to identify himself/herself, for example by entering his/her name on a keyboard or by presenting an access badge. Thus, the pre-recorded image which corresponds to the thus identified user can be directly searched and the comparison can be carried out more rapidly.

The inventor identified, in this process, two separate steps to be performed by the user: presenting a non-biometric identification means (presenting a badge, entering a name on a keyboard) and presenting a biometric feature (iris, fingerprint, or the like).

The use of biometric authentication may thus suffer slowness in its implementation.

Thus, there is a need to make the biometric authentication of users easier and/or faster to implement, particularly from the point of view of the authenticated user.

SUMMARY OF THE INVENTION

The present invention has been developed within this framework.

A first aspect of the present invention relates to a system for biometrically authenticating a user, comprising:
  means for obtaining image data that are representative of at least one user-associated biometric feature and at least one user-associated identifier,
  means for extracting said at least one biometric feature in said image data,
  means for extracting said at least one identifier in said image data,
  means for performing a search for a reference biometric feature associated with said at least one identifier,
  means for comparing said extracted biometric feature with said reference biometric feature, and
  means for authenticating said user in accordance with a result of said comparison.

Thus, the derivation of the identifier and the derivation of the biometric feature can be performed nearly simultaneously, thus simplifying the operations to be performed by the user. For example, the user has to present himself/herself only once to the biometric identification system for acquiring the image data.

The derivation of the biometric feature and the derivation of the identifier are combined, thus facilitating authentication.

Biometric systems involve image data acquisition. The present invention takes advantage of this image processing to include the derivation of the identifier.

The present invention enables the use of biometric authentication, even in applications which involve very large user flows (entrance to a train station, an airport, or the like).

In addition, the need for the user to present his/her identifier and the part of his/her body which carries the biometric feature at the same time, possibly in a given spatial arrangement, allows the likelihood of fraud to be reduced.

For example, said image data belongs to the same image. Thus, a single image data acquisition is carried out. It is thus possible to simplify and speed up the authentication process, in particular from the user's perspective.

Said image data can also be distributed between at least two images representing said biometric feature and said identifier, respectively.

It is thus possible to perform finer image analyses, and thus enhance the accuracy and security of authentication.

The system may additionally include a single image data acquisition unit for acquiring said image data.

Thus, it is possible to simplify the implementation of authentication through the use of a single image data acquisition unit for the biometric feature and for the identifier.

For example, said image data acquisition unit is an optical unit configured for:
  acquiring a first image at at least one first wavelength, and
  acquiring a second image at at least one second wavelength different from said at least one first wavelength.

The use of different wavelengths to obtain the image data of the identifier and the biometric feature allows a single image data acquisition unit to be used.

This also allows the identifier to be imprinted so that it is not visible in the visible range of the human eye, thus making it inconspicuous.

The system may additionally include at least two image data acquisition units for acquiring said image data.

Thus, it is possible to select, for each type of image data acquisition, a particularly adapted type of unit. For example, one may use a fingerprint sensor, and a CCD sensor ("Charge-Coupled Device").

For example, the system may additionally include:
  means for acquiring a first image which is representative of said biometric feature using a first image data acquisition unit, and
  means for acquiring a second image which is representative of said identifier using a second image data acquisition unit different from the first image data acquisition unit.

The biometric feature is for example at least one of a users fingerprint, a user's vein pattern and a users face.

For example, said identifier is imprinted onto a users skin portion using at least one of tattooing, engraving and depositing an adhesive carrier.

Tattooing may for example be done by means of an ink which is invisible in the visible range, but which may be developed in the ultraviolet or infrared range.

In yet another example, said identifier is imprinted onto a subcutaneous feature arranged beneath a skin feature of the user.

The biometric feature may also be an iris of the user.

Said identifier may be imprinted onto an ophthalmic lens or a spectacle frame worn by the user.

According to possible alternative embodiments, the identifier may be imprinted onto the surface of a jewel (typically worn by the user).

All of these applications allow the user to wear the identifier in a discreet manner, while making biometric authentication possible.

According to another possible alternative embodiment, the identifier may be imprinted onto a smart card, for example a smart card according to the ISO 7816 standard.

Said identifier may also comprise a link to a remote server. As explained below, this allows for indirect identification of the user.

For example, said biometric feature and said identifier are superimposed.

Thus, the image data acquisition units can operate over a reduced surface area, which reduces the space required for the system. In addition, this avoids the user having to perform movements to present the biometric feature and then the identifier (or vice versa).

Said identifier may be displayed on a screen of a user-associated portable electronic device.

It is thus possible to use more complex identifiers. It is also possible to update these on a more regular basis.

A process for providing the user with a carrier for the identifier may be provided.

The system may then include:
means for acquiring image data that are representative of the user-associated biometric feature,
means for generating the user-associated identifier,
means for storing said acquired data as the reference biometric feature and said identifier in a table which associates said acquired data with said identifier, and
means for imprinting said identifier into said carrier.

For example, said imprinting means include at least one of:
means for tattooing the identifier onto a skin feature of the user,
means for engraving the identifier onto a skin feature of the user,
means for printing said identifier onto an adhesive carrier and gluing said carrier to a skin feature of the user,
means for storing said identifier in a portable electronic device which is configured to display said identifier and is associated with the user, and
means for engraving said identifier onto an ophthalmic lens or a spectacle frame associated with the user.

A second aspect of the present invention relates to a method for biometrically authenticating a user, which includes the steps of:
obtaining image data representative of at least one user-associated biometric feature and at least one user-associated identifier,
extracting said at least one biometric feature in said image data,
extracting said at least one identifier in said image data,
performing a search for a reference biometric feature associated with said at least one identifier,
comparing said extracted biometric feature with said reference biometric feature, and
authenticating said user in accordance with a result of said comparison.

For example, said image data belong to the same image.

Said image data can also be distributed between at least two images representing said biometric feature and said identifier, respectively.

The method may additionally include a step of acquiring said image data by means of a single image data acquisition unit.

For example, said image data acquisition unit is an optical unit, and the method includes the steps of:
acquiring a first image using said image data acquisition optical unit, at at least one first wavelength, and
acquiring a second image using said image data acquisition optical unit, at at least one second wavelength different from said at least one first wavelength.

The method may additionally include a step of acquiring said image data by means of at least two image data acquisition units.

For example, the method may additionally include the steps of:
acquiring a first image which is representative of said biometric feature using a first image data acquisition unit, and
acquiring a second image which is representative of said identifier using a second image data acquisition unit different from the first image data acquisition unit.

The biometric feature is for example at least one of a users fingerprint, a user's vein pattern and a users face.

For example, said identifier is imprinted onto a users skin portion using at least one of tattooing, engraving and depositing an adhesive carrier.

Tattooing may for example be done by means of an ink which is invisible in the visible range, but which may be developed in the ultraviolet or infrared range.

In yet another example, said identifier is imprinted onto a subcutaneous feature arranged beneath a skin feature of the user.

The biometric feature may also be an iris of the user.

Said identifier may be imprinted onto an ophthalmic lens or a spectacle frame worn by the user.

Said biometric feature and said identifier are superimposed.

Said identifier may be displayed on a screen of a user-associated portable electronic device.

A process for providing the user with a carrier for the identifier may also be provided, which includes the steps of:
acquiring image data that are representative of the user-associated biometric feature,
generating the user-associated identifier,
storing said acquired data as the reference biometric feature and said identifier in a table which associates said acquired data with said identifier, and
imprinting said identifier into said carrier.

For example, said imprinting step includes at least one of:
tattooing the identifier onto a skin feature of the user,
engraving the identifier onto a skin feature of the user,
printing said identifier onto an adhesive carrier and gluing said carrier to a skin feature of the user,
storing said identifier in a portable electronic device which is configured to display said identifier and is associated with the user, and
engraving said identifier on an ophthalmic lens or a spectacle frame associated with the user.

A third aspect relates to a computer program as well as a computer program product and a storage medium for such program and product, enabling the implementation of a method according to the second aspect when the program is loaded and executed by a processor of a biometric authentication device and/or system.

A fourth aspect relates to a system for biometrically authenticating a user for the implementation of a method, for example, according to the first aspect.

Such a system may include:
a communication unit configured to obtain the image data representative of at least one user-associated biometric feature and at least one user-associated identifier, and
a processing unit configured to extract said at least one biometric feature in said image data, extract said at least one identifier in said image data, perform a search for a reference biometric feature associated with said at least one identifier, compare said extracted biometric feature with said reference biometric feature, and authenticate said user in accordance with a result of said comparison.

The system may additionally include a memory unit configured to store an association table which associates user identifiers with reference biometric features of users, said search being performed within said memory unit.

The system may additionally include at least one image data acquisition unit for acquiring said image data.

The system may additionally include at least one image data acquisition unit and one optical image data acquisition unit configured to acquire a first image which represents said biometric feature, at at least one first wavelength, and acquire a second image which represents said identifier, at at least one second wavelength different from said at least one first wavelength.

The system may additionally include at least two image data acquisition units.

For example, a first image data acquisition unit is configured to acquire a first image which is representative of said biometric feature, and a second image data acquisition unit is configured to acquire a second image which is representative of said identifier.

The system may additionally include at least one of an ophthalmic lens and a spectacle frame associated with the user, wherein said ophthalmic lens and said spectacle frame carry said user-associated identifier.

The objects according to the second, third and fourth aspects provide at least the same advantages as those provided by the system according to the first aspect.

In a manner original per se, the present invention proposes a system for biometrically authenticating a user, which includes means for obtaining image data at a wavelength outside the visible range; these obtaining means are adapted to analyze (and extract) a pattern (for example a tattoo or print) formed, outside the visible range, on the users body or an accessory worn by the user. The pattern may represent an identifier, as explained below.

BRIEF DESCRIPTION OF THE DRAWINGS

Other advantages, objects and features of the present invention will become apparent from the following detailed description, given by way of non-limiting example, with reference to the accompanying drawings in which.

DETAILED DESCRIPTION OF THE INVENTION

Modes of biometric authentication of a user are described below. The examples of fingerprint recognition, iris recognition and recognition of a vein pattern of are described. The present invention however is not limited to these types biometric recognition. Other biometric features can be used including, for example, the face, or the like.

FIGS. 1 to 4 illustrate an authentication using the vein pattern of a hand as the biometric feature.

Figure 1:
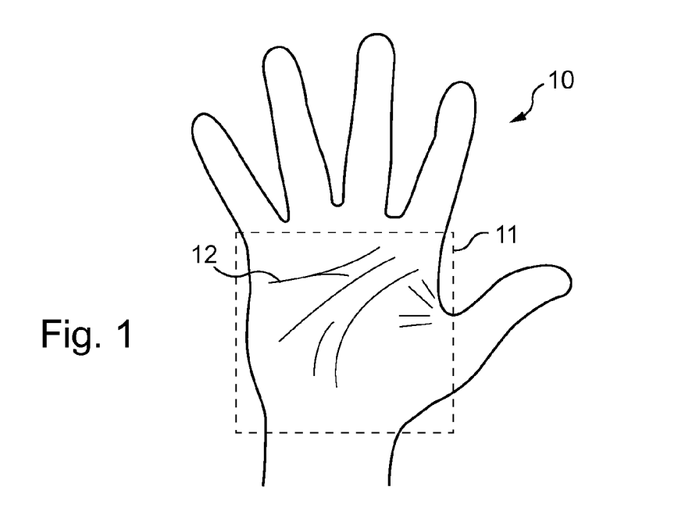
FIGS. 1 to 4 illustrate an authentication process using a users vein pattern.
Figure 2:
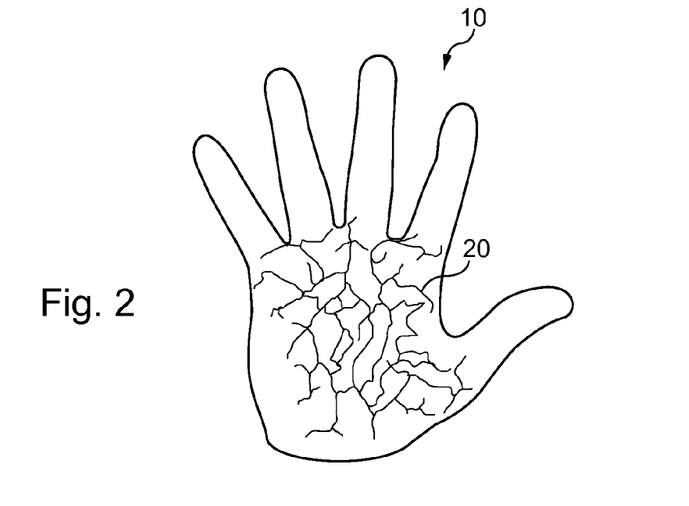

FIG. 1 schematically illustrates a hand 10 of a user to be authenticated. When this hand is illuminated with light at wavelengths of the visible spectrum, the area 11 of the palm of the hand reveals lines 12 corresponding to folds in the latter. However, as illustrated in FIG. 2, when this hand is illuminated with light at wavelengths from the infrared spectrum, it is possible to obtain an image of the vein pattern 20 located underneath the skin of the illuminated hand. It is thus possible to obtain an image of this vein pattern. The vein pattern is then used as the biometric feature.

Figure 3:
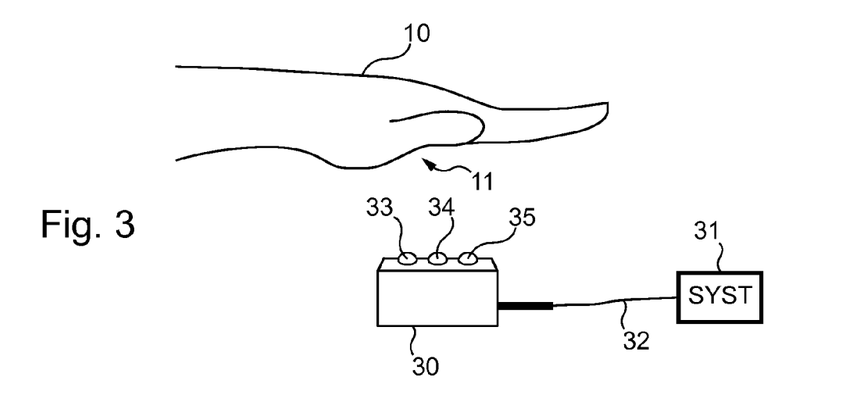

For that purpose, as illustrated in FIG. 3, the user may place his/her hand 10 above an image data acquisition device 30 (here, an optical device) coupled to a biometric authentication system 31 according to embodiments of the present invention. Such a system is described in more detail in the description below with reference to FIG. 14. The image data acquisition device and the authentication system, for example, are connected through a connection cable 32. Alternatively, these can be connected through a wireless connection. The image data acquisition device may also be part of the biometric authentication system.

The image data acquisition device includes a first light source 33 for illuminating the palm 11 of the user's hand when placed above the device. For example, the light source is a source emitting at least one wavelength of the infrared spectrum.

The image data acquisition device includes a first image data acquisition unit 34, to obtain an image of the vein pattern when the palm of the hand is illuminated. When the light source emits in the infrared region, the first image data acquisition unit also operates in the infrared region.

This image data acquisition unit may also be configured to obtain the image data of a user-associated identifier, as described below with reference to FIG. 4. Alternatively, the image data acquisition device may additionally include a second image data acquisition unit 35, dedicated to the acquisition of image data representative of this identifier.

Figure 4:
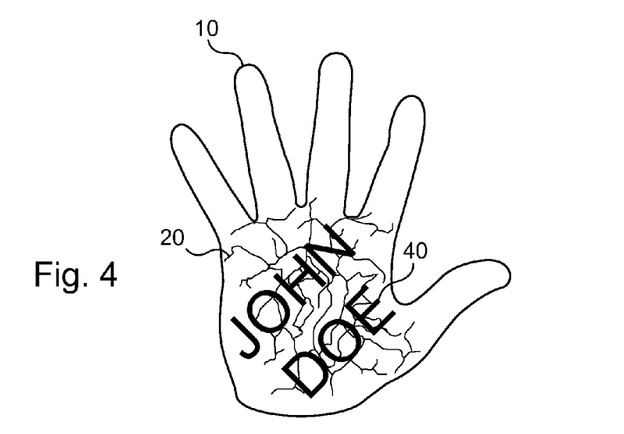

FIG. 4 illustrates an identifier 40 imprinted onto the palm of the user's hand 10. This identifier may have several forms. For example, it may comprise an imprinted string of alphanumeric characters, which, here, is a character string corresponding to the user's first and family names ("JOHN DOE"). This imprinting may be developed with an ink which is invisible in the visible spectrum, but which may be developed in other ranges, for example, infrared or ultraviolet.

The identifier may also be a bar code, a logo or any other feature allowing user identification.

This identification may be direct, by using, for example, the first name and the family name of the user. This identification may also be indirect, by using a link to a remote server, for example on the internet network (for example in the form of a URL or internet address), by storing, for example, the user's family name and first name. It may also be a serial number.

The identifier may be developed with ink, but may also be made by means of other techniques such as engraving, or gluing a tag with the identifier. The identifier may furthermore be contained in a subcutaneous data medium placed underneath the skin of the palm of the hand. The identifier should however be such as a to allow the acquisition of image data of the vein pattern underneath the skin of the palm of the hand.

The identifier may be superimposed on the biometric feature, which, here, is the vein pattern. It may also be placed at an offset position with respect to the latter.

When the identifier is imprinted onto the palm of the hand by means of an ink which is invisible in the visible range, and in order not to disrupt the acquisition of image data of the vein pattern, this ink may be sensitive to a wavelength different from the one used for acquiring the image data of the vein pattern.

Thus, in the example of FIG. 3, the image data acquisition unit may, for example, use a first wavelength (or plurality of wavelengths) for acquiring the image data of the vein pattern and the image data acquisition unit may use a different wavelength (or plurality of wavelengths) for acquiring the image data of the identifier.

When the image data acquisition device 30 includes only one image data acquisition unit, the latter may, for example, operate at both wavelengths (or pluralities of wavelengths).

The image data acquisition units are not limited to optical units. Other types of unit can be used including, for example, ultrasound units, capacitive units, or the like.

The embodiments of the present invention are not limited to the authentication of the user based on a vein pattern.

In the following, an example of the use of the user's fingerprints as the biometric feature is described. The features described for the use of the vein pattern can be implemented in the next example, in particular with regard to the image data acquisition device and the identifier.

Figure 5:
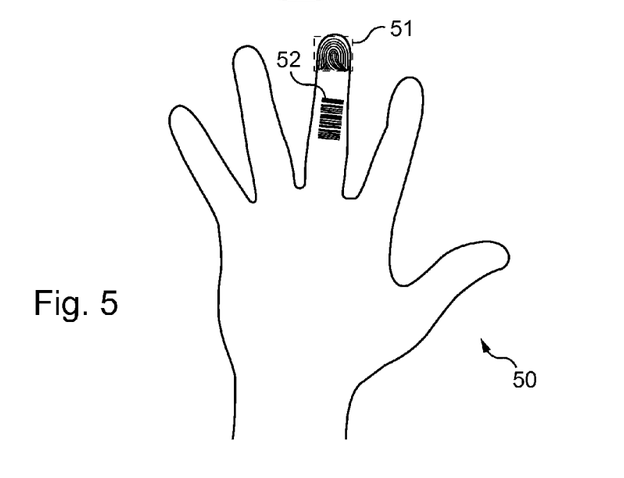
FIGS. 5 and 6 illustrate an authentication process using a fingerprint.

FIG. 5 illustrates a hand 50 of a user to be authenticated. Each finger of this hand has fingerprints 51. These fingerprints can provide a biometric feature according to embodiments of the present invention. The user-associated identifier may, for example, be a bar code 52. In the example of FIG. 5, the identifier is not superimposed on the biometric feature (here, the fingerprint). However, it could also superimposed on the latter.

Alternatively, the identifier could be imprinted onto the surface of a jewel worn on a finger of the user.

Figure 6:
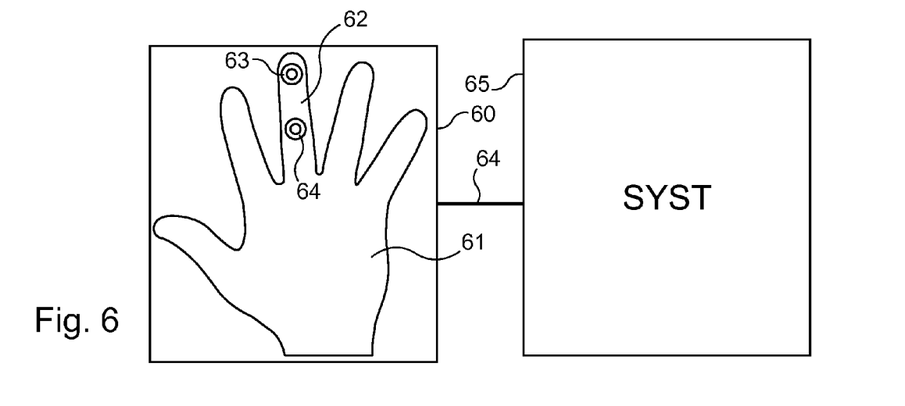

FIG. 6 illustrates an image data acquisition device 60 for acquiring the image data of the hand 50.

This device includes a support 61 for accommodating the user's hand. This support, for example, has the shape of the hand. In at least one portion 62 of the support intended for accommodating a finger of the hand, an image data acquisition unit 63 is arranged for acquiring the image data of the fingerprint and possibly of the identifier, if the latter is superimposed on the former. In this portion, another image data acquisition unit 64 may also be arranged, for example, with regard to the identifier. If, as shown in the example of FIG. 5, the identifier is located in an area of the finger which is different from the one in which the fingerprint is located, units 63 and 64 are arranged in such a way that when the user places his/her hand on the support, the fingerprint is located in front of unit 63 and the identifier is located in front of unit 64.

Units 63 and 64 can be optical units as already described, ultrasonic units or capacitive units, or the like.

In the case of optical units, as described with reference to FIGS. 3 and 4, each unit can be associated with a light source and use different wavelengths.

The image data acquisition device 60 is connected, via a connection cable 64 or wirelessly, to a biometric authentication system 65. Such a system is described in detail with reference to FIG. 14. The image data acquisition device may also be part of system 65.

In the following, an example of the use of the user's iris as the biometric feature will be described. The features described for the use of the vein pattern and/or fingerprints can be implemented in the next example, in particular with regard to the image data acquisition device and the identifier.

Figure 7:
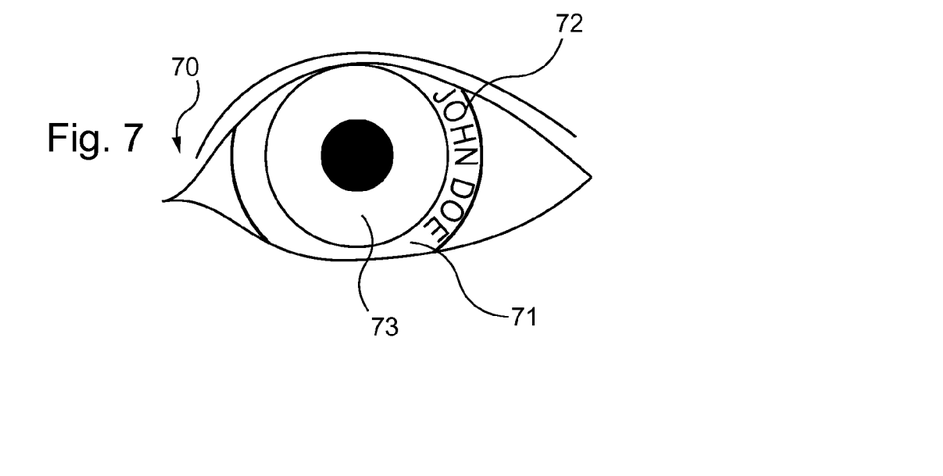
FIGS. 7 to 9 illustrate an authentication process using a users iris.

FIG. 7 illustrates an authentication process using iris recognition.

A user wears, on an eye 70, an ophthalmic contact lens 71. A user-associated identifier 72 is imprinted on the periphery of this lens. This identifier, for example, is engraved using micro-engraving or is printed with an ink which is appropriate for ophthalmic use. This comprises a string of alphanumeric characters which, for example, represent the users first name and family name ("JOHN DOE"). As already described with reference to FIG. 4, this identifier may include the users family name and first name so that it can be directly identified. The identifier may also contain a link to a remote server (for example in the form of a URL or an internet address) which points to a server containing the user's first name and family name. It may also be a serial number.

The identifier may be in other forms, including, for example, a string of alphanumeric characters, a bar code, a logo, or the like.

Here, the authentication process includes obtaining image data that are representative of this identifier, and of the eye's iris 73.

Figure 8:
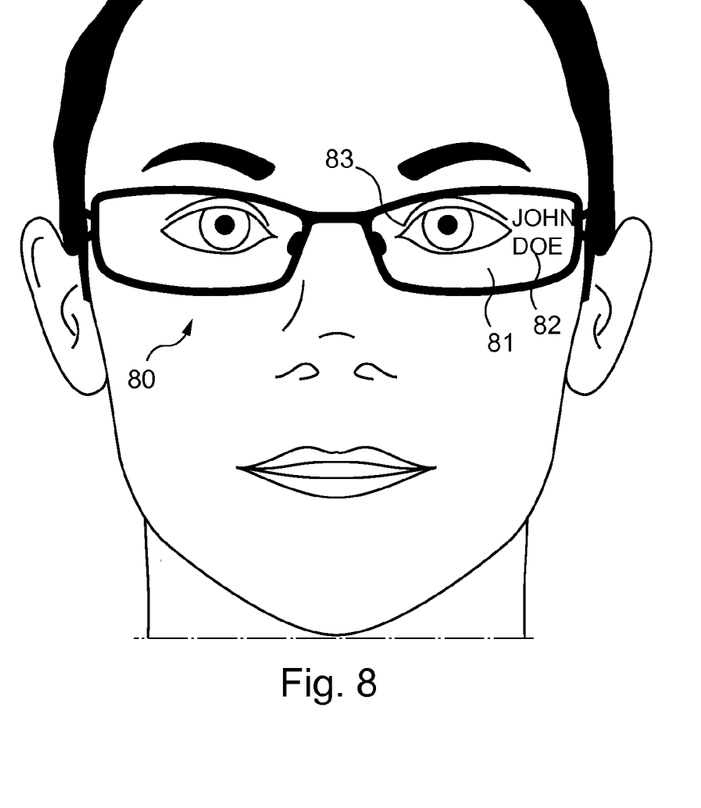

FIG. 8 illustrates another authentication process using iris recognition.

A user wears a pair of spectacles 80, which includes an ophthalmic lens 81 (or prescription lens). This lens comprises an identifier 82 on its surface or within its thickness. The identifier (a string of alphanumeric characters, a logo, or the like) may be engraved, printed, or the like.

The identifier may also be carried by a data medium integrated into the lens.

Finally, the identifier, instead of being integrated into the lens, may be carried on spectacle frame.

Here, the authentication process comprises obtaining image data that are representative of this identifier, and of the iris of the eye 83.

Alternatively, an identifier on an ocular glass may be used in the context of facial recognition (recognition of the user's face). Furthermore, according to another alternative embodiment applicable in the case of facial recognition, the identifier could be engraved or tattooed onto the face.

Moreover, in the context of the recognition of the face, or iris of the eye, one may consider tattooing the eye cornea (corneal tattooing) as the identifier.

Figure 9:
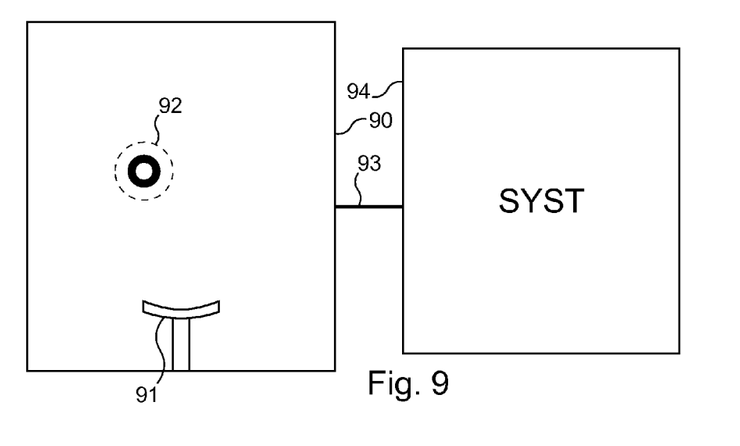

FIG. 9 illustrates an image data acquisition device 90 for acquiring image data of an iris and an identifier, as disclosed with reference to FIGS. 7 and 8.

The device includes a support 91 for accommodating the user's chin so that he/she presents his/her eye to one or several image data acquisition units 92.

This unit 92 allows image data that are representative of the user's iris and his/her associated identifier to be obtained. An image data acquisition unit (not shown) may be dedicated to the identifier.

As already mentioned for other examples, this unit is of the optical type and uses different wavelengths for the iris and the identifier.

The device may be connected by a cable 93 or wirelessly to a biometric authentication system 94. Such a system is described below with reference to FIG. 14.

In the following, an example of the use of a screen of the portable electronic device to display the user-associated identifier is described. The features described for the preceding examples can be implemented in the next example, in particular with regard to the image data acquisition device, the identifier and the biometric feature.

Figure 10:
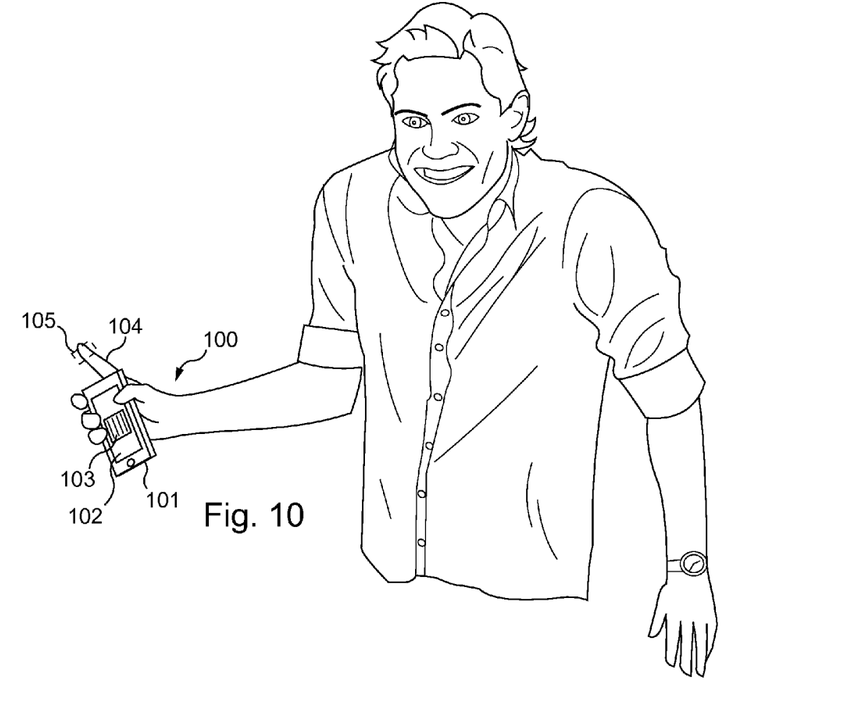
FIGS. 10 and 11 illustrate an authentication process using a portable electronic device displaying a user-associated identifier.

FIG. 10 illustrates biometric authentication using an authenticated user-associated portable electronic device. The use of this portable electronic device is, for example, combined with the use of fingerprints as the biometric feature.

A user holds in his/her hand 100 a portable electronic device 101, with a screen 102. For example, this may be a mobile phone. The portable electronic device is configured to display a user-associated identifier on its screen. For example, the identifier is displayed in the form of a bar code 103. The identifier may be in other forms: a string of alphanumeric characters, a logo, or the like.

To authenticate, the user presents the mobile electronic device to a biometric authentication system, so that the latter can acquire the image data of the displayed identifier. The user also presents a biometric feature so that the biometric authentication system can acquire the image data of this feature.

For example, while presenting the screen of the portable electronic device to the biometric authentication system, the user presents a finger 104 to the system. For example, this may be the index finger. The user may, for example, hold the portable electronic device in front of the authentication system while keeping his/her index finger raised so that he/she also presents the fingerprint 105 of his/her finger to the system.

The user could present another biometric feature, for example, an iris, a face, or the like.

The use of a portable electronic device provided with a screen allows more complex identifiers to be implemented with respect to those printed on the skin or ophthalmic lenses. It is also possible to change the user-associated identifier on a regular basis.

Alternatively, the identifier could be imprinted onto the surface a smart card, for example, a smart card according to the ISO 7816 standard.

Figure 11:
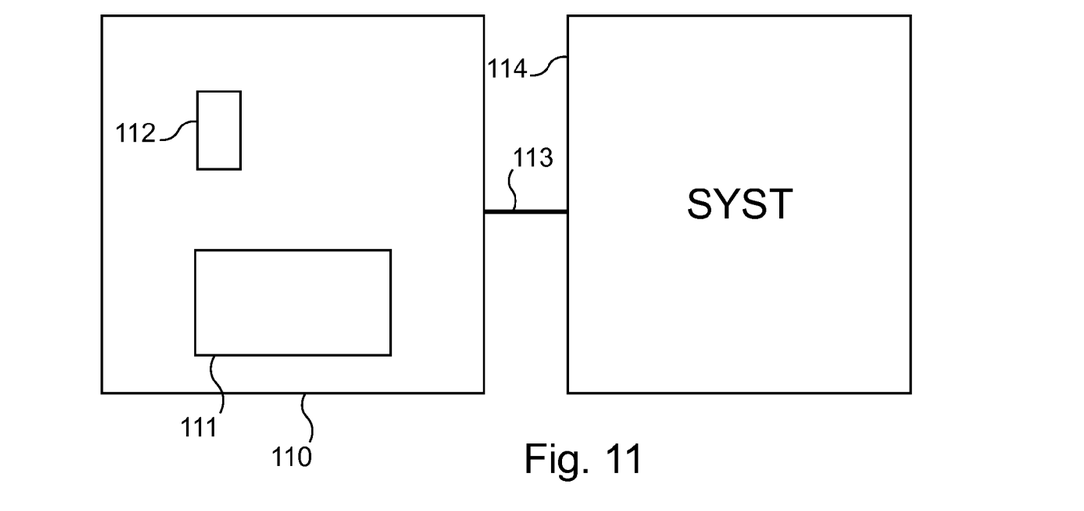

FIG. 11 illustrates an image data acquisition device 110 for acquiring image data of a fingerprint and an identifier, as explained with reference to FIG. 10.

The device includes a first image data acquisition unit 111 configured to acquire the image data of the image displayed using the screen of the portable electronic device presented by the user. The device also includes a second image data acquisition unit 112 configured to acquire the image data of a biometric feature of the user, for example, a fingerprint of a finger. Other biometric features can be used.

As already mentioned for other examples, the image data acquisition units can be of the optical type.

The device may be connected by a cable 113 or wirelessly to a biometric authentication system 114. Such a system is described below with reference to FIG. 14.

A method for implementing biometric authentication is described with reference to FIG. 12, which is a flowchart of steps that can be implemented in such a method. For example, these steps are implemented using a biometric authentication system according to embodiments of the present invention, for example, a biometric authentication system such as that described hereinafter with reference to FIG. 14.

Step 1200 is a step of image data acquisition. This data pertains to a biometric feature of the user and his/her associated identifier. Depending on the implementation, the image data may represent one and the same image containing both the biometric feature and the identifier. The image data may also represent several images with at least one image containing the biometric feature and at least one image containing the identifier.

The acquisition of image data can be performed by means of one or several optical image data acquisition units. Other types of image data acquisition unit can be used, for example, of the ultrasonic or capacitive type, or the like.

Once the image data has been acquired, it is transmitted to a processing unit, which thus obtains the data. In a step 1201, the biometric feature (a fingerprint, a face, an iris, a vein pattern, or the like) is extracted. In a step 1202 the identifier (a string of alphanumeric characters, a logo, a bar code, or the like) is extracted.

The extractions are performed, for example, through pattern or character recognition. For the biometric feature (and possibly also for the identifier), extraction allows a representation of the biometric feature (or, where appropriate, the identifier) to be obtained, which is to be compared with a reference feature as described below.

Once the biometric feature and the identifier have been obtained, a search for the reference feature is performed (step 1203), based on the identifier.

This search may be performed within the biometric authentication system itself, or within an external (or remote) database. This comprises sending a data query to a storage module in order to obtain a reference feature associated with the identifier in the memory unit.

The reference feature is a representation of a biometric feature previously generated by a user. The memory unit may thus be considered as a bank of biometric features (or representations thereof), each reference feature being associated with a user who is granted access to a good, a location, a service, or the like.

The search for the reference feature is carried out in a step 1204. The search is performed within the system itself or within the external database. This comprises, for example, reading a reference feature from an association table using an entry which contains the identifier obtained in step 1202.

If a reference feature matches the identifier, this feature is obtained in step 1205. For example, the feature is received from the database.

Then, a comparison is performed in step 1206 to determine whether the biometric feature extracted in step 1202 matches the reference feature. The comparison is performed, for example, using the authentication system. This comprises, for example, the derivation of a set of common features between the extracted biometric feature and the biometric feature, for example, based on the afore-mentioned representation. These common features are searched, for example, in predetermined areas.

For example, a matching percentage is then determined.

According to embodiments of the present invention, the comparison is performed within the database. In this case, the extracted biometric feature is transmitted to the database in view of the comparison and the system receives a reply corresponding to the result of the comparison (for example the percentage).

Then, in a step 1207, it is determined whether this matching percentage makes it possible to conclude that the biometric feature does match the reference feature. For example, the percentage is compared with a threshold.

If it is determined that the extracted biometric feature does not match the reference feature (NO), the user is not authenticated and a failure message is issued in step 1208. For example, a message is displayed on a screen.

If it is determined that the extracted biometric feature matches the reference feature (YES), the user is authenticated and a successful authentication message is issued in step 1209. For example, a message is displayed on a screen.

According to an already considered alternative embodiment which uses indirect identification by means of a link to a remote server (for example through the internet network), the authentication system or the database can query the remote server by using the link in order to obtain, in response, an identifier; for that purpose, for example, the server stores a table which associates data received in an internet query (for example http) containing identifiers, which table allows the identifier sent back to the authentication system to be found.

The comparison between the biometric feature and the reference feature can also be performed within this remote server, which, in this case, also stores the reference feature. Data representative of the biometric feature can in this case be sent to the remote server.

Alternatively, the remote server may provide the reference biometric feature to the entity that performs the comparison using a secure communication through cryptographic means (including, in particular, a cryptographic key) stored in the remote server and/or the entity that performs the comparison.

The afore-mentioned method can be complemented by a process which provides a carrier for the user-associated identifier. Steps of such a process are described with reference to the flowchart of FIG. 13. These steps can be implemented prior to those of FIG. 12.

Figure 13:
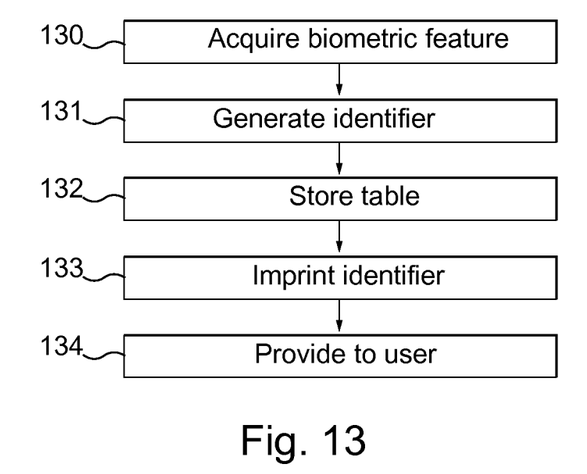

In a step 130, data representative of a users biometric feature is obtained. For example, this data is obtained using image data acquisition, via an image data acquisition unit, of the optical, ultrasonic, or capacitive type, or the like.

An identifier is then generated. This comprises, for example, an alphanumeric character string, a bar code, or the like.

The identifier is then associated with the obtained data (which may have been processed in order to be simplified in view of the comparisons performed in step 1206) in an association table. The obtained data is stored therein as the reference feature.

The identifier is then imprinted onto a carrier in a step 133. This imprinting may include tattooing, or engraving on a users skin portion (palm of the hand, finger, or the like). This may additionally comprise printing onto a prescription lens, or a tag to be glued to a users skin portion. This may also include printing or engraving the identifier onto a spectacle frame.

Imprinting may also consist in saving the identifier into a memory of a portable electronic device provided with a screen and configured to display the identifier.

Finally, the carrier onto which the identifier has been imprinted is provided to the user in a step 134. When comprises tattooing or engraving is performed, the step of providing the carrier consists in ending the tattooing or engraving process.

Figure 12:
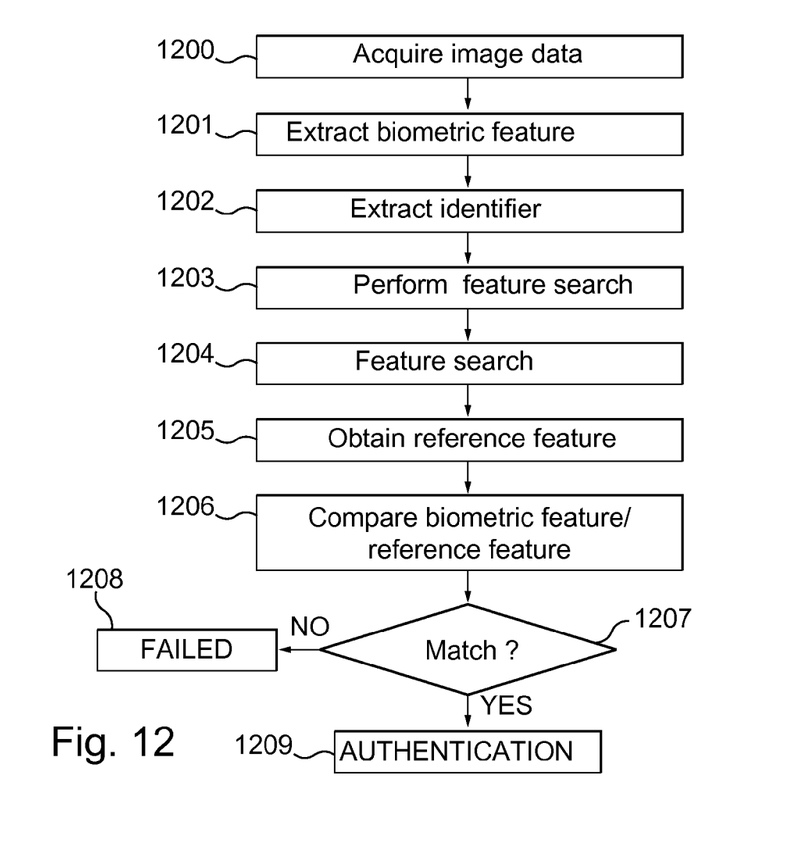
FIGS. 12 and 13 are flowcharts of steps implemented in embodiments of the present invention.

A computer program for the implementation of a method according to one embodiment of the present invention may be developed by a person skilled in the art upon reading the flowchart of FIGS. 12 and 13 and the present detailed description.

Figure 14:
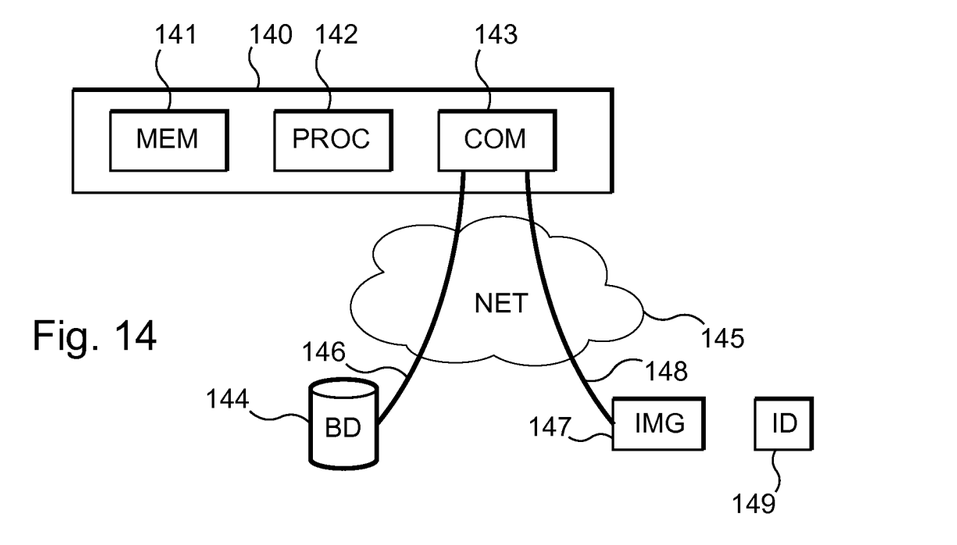
FIG. 14 schematically illustrates a system according to embodiments of the present invention.

FIG. 14 illustrates a biometric authentication system according to embodiments of the present invention. The system includes an authentication device 140. This device includes a memory unit 141 (MEM). This memory unit includes a random access memory to temporarily store computation data used in the implementation of a method according to one embodiment. The memory unit further includes a non-volatile memory (for example of the EEPROM type), for example, to store a computer program according to one embodiment, to be executed by a processor (not shown) of a processing unit 142 (PROC) of the system. The memory unit may also store other data such as discussed above. In particular, it may store an association table which associates user identifiers with reference features for comparison with these biometric features.

The device further includes a communication unit 143 (COM) to carry out communications, for example, to communicate with a database 144 (BD) via a network 145 (NET) and a connection 146 (wired or wireless). This database, for example, stores an association table which associates user identifiers with reference features for comparison with these biometric features (for example, the table is stored therein and not in the memory unit).

The communication unit may also carry out communications with an image data acquisition unit 147 (IMG) via the network 145 (NET) and a connection 148 (wired or wireless). The acquisition unit may be of the optical or ultrasonic type, or the like. The system may furthermore include several image data acquisition units.

The system may additionally include a user identifier display 149 (ID) to display the identifier so that the image data acquisition unit can obtain the identifier. The device may, for example, be a pair of spectacles, a portable electronic device with a screen (mobile phone, touch tablet, or the like), as described above.

The system as described above may be used for different types of authentication (fingerprints, face, iris, vein pattern, or the like).

The different units of the system can be part of a single integrated device or of several distributed devices. In the case of an integrated device, the network 145 can simply be a data bus.

The system may additionally include an imprinting unit (not shown) to imprint the identifier onto a carrier, as described with reference to FIG. 13.

The present invention has been described and illustrated in this detailed description with reference to the accompanying drawings. However, the present invention is not limited to the embodiments shown. Other variations, embodiments and combinations of features can be derived and implemented by the person skilled in the art upon reading this description and the appended figures.

To meet specific needs, a person skilled in the field of the Invention can apply changes or adaptations.

In the claims, the term "include" does not exclude other elements or other steps. The indefinite article "a" does not exclude the plural form. A single processor or several other units may be used to implement the invention. The various features shown and/or claimed may be advantageously combined. Their presence in the description or in different dependent claims does not preclude the possibility to combine these. Reference symbols should not be construed as limiting the scope of the invention.

The invention claimed is:

1. A system for biometrically authenticating a user, comprising:
   one or more processors;
   means for obtaining image data that are representative of at least one user-associated biometric feature and at least one user-associated identifier, the means for obtaining image data acquiring a first image indicative of the at least one user-associated biometric feature and at at least one first wavelength, and acquiring a second image of the at least one user-associated identifier at at least one second wavelength different from the at least one first wavelength, the first image and the second image being acquired approximately simultaneously;

means for extracting said at least one biometric feature in said image data;
means for extracting said at least one identifier in said image data;
means for performing a search for a reference biometric feature associated with said at least one identifier;
means for comparing said extracted biometric feature with said reference biometric feature; and
means for authenticating said user in accordance with a result of said comparison,
wherein the one or more processors cause one or more of the biometric feature extracting means to extract the at least one biometric feature, the identifier extracting means to extract the at least one identifier, the search performing means to perform the search, the comparing means to compare the extracted biometric feature with the reference biometric feature, and the authenticating means to authenticate the user.

2. The system according to claim 1, wherein said image data belongs to the same image.

3. The system according to claim 1, wherein said image data is distributed between at least two images representing said biometric feature and said identifier, respectively.

4. The system according to claim 1, further comprising a single image data acquisition unit configured to acquire said image data.

5. The system according to claim 3, further comprising at least two image data acquisition units configured to acquire said image data.

6. The system according to claim 5, further comprising:
means for acquiring the first image which is representative of said biometric feature using a first image data acquisition unit, and
means for acquiring the second image which is representative of said identifier using a second image data acquisition unit different from the first image data acquisition unit.

7. The system according to claim 1, wherein said biometric feature is at least one of a user's fingerprint, a user's vein pattern and a user's face.

8. The system according to claim 1, wherein said biometric feature is an iris of the user.

9. The system according to claim 1, wherein said identifier is imprinted onto a user's skin portion using at least one of tattooing, engraving and depositing an adhesive carrier.

10. The system according to claim 1, wherein said identifier is imprinted onto a subcutaneous feature arranged beneath a skin feature of the user.

11. The system according to claim 1, wherein said identifier is imprinted onto an ophthalmic lens or a spectacle frame worn by the user.

12. The system according to claim 1, wherein said identifier comprises a link to a remote server.

13. The system according to claim 1, wherein said biometric feature and said identifier are superimposed.

14. The system according to claim 1, wherein said identifier is displayed on a screen of a user-associated portable electronic device.

15. The system according to claim 1, further comprising means for providing the user with a carrier for the identifier, said means comprising:
means for acquiring image data that are representative of the user-associated biometric feature,
means for generating the user-associated identifier,
means for storing said acquired data as the reference biometric feature and said identifier in a table which associates said acquired data with said identifier, and
means for imprinting said identifier into said carrier.

16. The system according to claim 14, wherein said imprinting means includes at least one of:
means for tattooing the identifier onto a skin feature of the user,
means for engraving the identifier onto a skin feature of the user,
means for printing said identifier onto an adhesive carrier and gluing said carrier on a skin feature of the user,
means for storing said identifier in a portable electronic device which is configured to display said identifier and is associated with the user, and
means for engraving said identifier onto an ophthalmic lens or a spectacle frame associated with the user.

17. The system according to claim 1, further comprising at least one of an ophthalmic lens and a spectacle frame associated with the user, wherein said ophthalmic lens and said spectacle frame carry said user-associated identifier.

18. A method for biometrically authenticating a user, comprising:
obtaining image data, from an image data acquisition device, that are representative of at least one user-associated biometric feature and at least one user-associated identifier, the image data being obtained by acquiring a first image indicative of the at least one user-associated biometric feature and at at least one first wavelength, and acquiring a second image of the at least one user-associated identifier at at least one second wavelength different from the at least one first wavelength, the first image and the second image being acquired approximately simultaneously;
extracting said at least one biometric feature in said image data;
extracting said at least one identifier in said image data;
performing a search for a reference biometric feature associated with said at least one identifier;
comparing said extracted biometric feature with said reference biometric feature; and
authenticating said user in accordance with a result of said comparison.

19. A non-transitory computer-readable medium, comprising instructions to cause a processor of a system for biometrically authenticating a user to execute the method of claim 18.

20. A system for biometrically authenticating a user, comprising:
an image data acquisition device configured to obtain image data that are representative of at least one user-associated biometric feature and at least one user-associated identifier, the image data acquisition device acquiring a first image indicative of the at least one user-associated biometric feature and at at least one first wavelength, and acquiring a second image of the at least one user-associated identifier at at least one second wavelength different from the at least one first wavelength, the first image and the second image being acquired approximately simultaneously; and
a biometric authentication system extracting said at least one biometric feature in said image data, extracting said at least one identifier in said image data, performing a search for a reference biometric feature associated with said at least one identifier, comparing said extracted biometric feature with said reference biometric feature, and authenticating said user in accordance with a result of said comparison.

* * * * *